(12) United States Patent  
Park et al.

(10) Patent No.: US 9,838,079 B2  
(45) Date of Patent: Dec. 5, 2017

(54) POWER LINE COMMUNICATION APPARATUS AND METHOD, AND LOAD POWER MONITORING APPARATUS AND METHOD USING SAME

(71) Applicant: SAMSUNG ELECTRONICS CO., LTD., Suwon-si, Gyeonggi-do (KR)

(72) Inventors: Hyun Soo Park, Seoul (KR); Young Jin Park, Gyeonggi-do (KR); Sung Mok Seo, Seoul (KR); Jong Hyun Shin, Gyeonggi-do (KR); Jae Won Choi, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 681 days.

(21) Appl. No.: 13/759,522

(22) Filed: Feb. 5, 2013

(65) Prior Publication Data

US 2013/0200689 A1 Aug. 8, 2013

(30) Foreign Application Priority Data

Feb. 7, 2012 (KR) .................. 10-2012-0012142

(51) Int. Cl.
*H04B 3/54* (2006.01)
(52) U.S. Cl.
CPC ............. *H04B 3/542* (2013.01); *H04B 3/54* (2013.01); *H04B 2203/5458* (2013.01)
(58) Field of Classification Search
CPC .. H04B 3/54; H04B 3/542; H04B 2203/5458; H02J 13/002
USPC ..................................... 307/2, 147
See application file for complete search history.

(56) References Cited

U.S. PATENT DOCUMENTS

| | | | | |
|---|---|---|---|---|
| 6,956,463 | B2 * | 10/2005 | Crenella | ............... H04B 3/542 307/3 |
| 9,199,538 | B2 * | 12/2015 | Masuda | ............... B60L 3/0069 |
| 2007/0110192 | A1 | 5/2007 | Steiner | |
| 2008/0080625 | A1 | 4/2008 | Miyata | |

(Continued)

FOREIGN PATENT DOCUMENTS

| | | |
|---|---|---|
| CN | 2870312 | 2/2007 |
| CN | 101569109 | 10/2009 |

(Continued)

OTHER PUBLICATIONS

Extended European Search Report dated Jun. 5, 2013 corresponds to European Patent Application No. 13154278.9-1856.

(Continued)

*Primary Examiner* — Daniel Kessie
(74) *Attorney, Agent, or Firm* — Staas & Halsey LLP (57) ABSTRACT

A load power monitoring apparatus and method use a power line communication apparatus and method. The power line communication apparatus is capable of performing power line communication through a simple circuit structure by loading a data signal on a current signal supplied over the power line. The power line communication apparatus includes a transmission unit configured to generate a data signal using the current signal, which is supplied through the power line, as a carrier wave, and to transmit the data signal through the power line, and a reception unit configured to receive the data signal, which is generated by the transmission unit, through the power line.

20 Claims, 6 Drawing Sheets

(56) References Cited

U.S. PATENT DOCUMENTS

| | | | |
|---|---|---|---|
| 2009/0002136 A1* | 1/2009 | Taguchi | H04B 3/54 |
| | | | 375/259 |
| 2010/0117858 A1 | 5/2010 | Rozenboim | |
| 2010/0239265 A1 | 9/2010 | Henderson | |
| 2011/0300753 A1* | 12/2011 | Ichikawa | B60L 3/0069 |
| | | | 439/620.21 |
| 2012/0045926 A1* | 2/2012 | Lee | H01R 13/6691 |
| | | | 439/488 |
| 2013/0024385 A1* | 1/2013 | Kang | G01D 4/002 |
| | | | 705/304 |

FOREIGN PATENT DOCUMENTS

| | | |
|---|---|---|
| CN | 101651472 | 2/2010 |
| CN | 201464896 | 5/2010 |
| EP | 1 050 974 A2 | 5/1999 |
| JP | 2011-120324 | 6/2011 |
| KR | 10-2011-0003129 | 1/2011 |
| WO | WO2006/113945 A1 | 10/2006 |

OTHER PUBLICATIONS

PCT International Search Report dated May 15, 2013 corresponds to International Application No. PCT/KR2013/000899.
Chinese Office Action dated Jul. 22, 2015 in corresponding Chinese Patent Application No. 201380008530.4.
Chinese Office Action dated Mar. 24, 2016 issued in corresponding Chinese Patent Application 201380008530.4.
Canadian Notice of Allowance dated Jan. 4, 2017 in related Canadian Patent Application No. 2,864,093.
3rd Chinese Office Action dated Oct. 20, 2016 in related Chinese Patent Application No. 201380008530.4.
Chinese Office Action dated May 4, 2017 in related Chinese Patent Application No. 201380008530.4.
Decision of Rejection dated Sep. 6, 2017 in related Chinese Patent Application No. 201380008530.4.

* cited by examiner

POWER LINE COMMUNICATION APPARATUS AND METHOD, AND LOAD POWER MONITORING APPARATUS AND METHOD USING SAME

CROSS-REFERENCE TO RELATED APPLICATIONS

This application claims the benefit of Korean Patent Application No. 2012-0012142, filed on Feb. 7, 2012, in the Korean Intellectual Property Office, the disclosure of which is incorporated herein by reference.

BACKGROUND

1. Field

Embodiments of the present disclosure relate to a power line communication (PLC) apparatus and method, and more particularly, to a power line communication apparatus and method configured to perform communication while supplying power at the same time through a power line configured to supply power.

2. Description of the Related Art

A power line communication apparatus performs communication through a power line that is already provided, and thus no additional wiring work is needed. The power line is capable of reaching a basement or other enclosed domain which cannot be reached by wireless technology. As a result, in many fields, a communication network using power line communication is being adopted. For example, power line communication is being adapted as a method used to form a communication network as a home network.

However, such power line communication performs communication by loading a data signal on a voltage signal, and thus peripheral circuits such as various filters, transformers, and diodes are being used to load the data signal on the voltage signal. As a result, the structure of the circuit becomes complex, and the product cost is increased as additional components other than the circuit structure are needed for communication.

SUMMARY

Additional aspects and/or advantages will be set forth in part in the description which follows and, in part, will be apparent from the description, or may be learned by practice of the invention.

Therefore, it is an aspect of the present disclosure to provide a power line communication apparatus configured to load a data signal on a current signal of power supplied through a power line, and thus a power line communication may be performed through a further simple circuit structure.

Additional aspects of the disclosure will be set forth in part in the description which follows and, in part, will be obvious from the description, or may be learned by practice of the disclosure.

In accordance with one aspect of the present disclosure, a power line communication apparatus includes a transmission unit and a reception unit. The transmission unit may be configured to generate a data signal and to transmit the data signal through a power line supplying power including a current signal which is supplied through the power line, as a carrier wave. The reception unit may be configured to receive the data signal, which is generated by the transmission unit, through the power line.

The data signal may be configured to represent status information of a load that is supplied with the power through the power line.

The status information of the load may be at least one of ON/OFF status information of the load, information on the amount of power consumption of the load, and information on a power consumption pattern of the load.

Plural transmission units may be installed to correspond to plural loads.

The transmission unit may be coupled between a concentric plug and a plug of the load so as to be electrically connected to the concentric plug and the plug of the load.

The reception unit may be installed at a node to which the loads are commonly connected.

The node to which the load is commonly connected may include a distributor configured to supply power to the load.

The transmission unit may include a current sensor, a signal generating unit, a switch and a resistor. The current sensor may be configured to detect an amount of current being supplied to the load. The signal generating unit may be configured to generate a data signal that represents status information of the load based on the amount of the current detected by the current sensor. The switch may be configured to be turned ON/OFF by the data signal that is generated by the signal generating unit. The resistor may be connected in series with the switch so that a current flows through the resistor when the switch is turned ON.

The reception unit may include a current sensor and a signal processing unit. The current sensor may be configured to detect the data signal being received through the power line by detecting an amount of current that flows through the power line. The signal processing unit may be configured to restore the data signal based on the amount of the current detected by the current sensor.

In accordance with another aspect of the present disclosure, a load power monitoring apparatus using power line communication includes a transmission unit, a reception unit, and a control unit. The transmission unit may be configured to generate a data signal representing status information of a load, and to transmit the data signal through a power line supplying power including a current signal, the data signal using the current signal supplied through the power line as a carrier wave. The reception unit may be configured to receive the data signal, which is generated by the transmission unit, through the power line. The control unit may be configured to determine a status of the load by determining the status information of the load from the data signal being received through the reception unit.

The status information of the load may be at least one of ON/OFF status information of the load, information on the amount of power consumption of the load, and information on a power consumption pattern of the load.

Plural transmission units may be installed to correspond to plural loads.

The transmission unit may be coupled between a concentric plug and a plug of the load so as to be electrically conducted to the concentric plug and the plug of the load.

The reception unit may be installed at a node to which the loads are commonly connected.

The node to which the load is commonly connected may include a distributor configured to supply power to the load.

The transmission unit includes a current sensor, a signal generating unit, a switch, and a resistor. The current sensor may be configured to detect an amount of current being supplied to the load. The signal generating unit may be configured to generate a data signal that represents the status information of the load based on the amount of the current detected by the current sensor. The switch may be configured to be turned ON/OFF by the data signal that is being generated by the signal generating unit. The resistor may be connected in series with the switch so that a current flows through the resistor when the switch is turned ON.

The reception unit may include a current sensor and a signal processing unit. The current sensor may be configured to detect the data signal being received through the power line by detecting an amount of current that flows through the power line. The signal processing unit may be configured to restore the data signal based on the amount of the current detected by the current sensor.

In accordance with another aspect of the present disclosure, a power line communication method is as follows. A data signal may be generated and the data signal may be transmitted through a power line supplying power including a current signal, the data signal using the current signal supplied through the power line as a carrier wave. The data signal may be received through the power line.

The data signal may be configured to represent status information of a load that operates by being supplied with power through the power line.

The status information of the load may be at least one of ON/OFF status information of the load, information on the amount of power consumption of the load, and information on a power consumption pattern of the load.

In accordance with another aspect of the present disclosure, a load power monitoring method is as follows. A data signal comprising status information of a load may be generated and the data signal may be transmitted through a power line supplying power including a current signal, the data signal using the current signal supplied through the power line as a carrier wave. The data signal may be received through the power line. The status information of the load may be converted from the data signal.

The status information of the load may be at least one of ON/OFF status information of the load, information on the amount of power consumption of the load, and information on a power consumption pattern of the load.

In accordance with another aspect of the present disclosure, an apparatus for connection to a load in an enclosed location comprises a transmission unit. The transmission unit generates a data signal and transmits the data signal through a power line supplying power including a current signal, to the load in the enclosed location. The data signal uses the current signal supplied through the power line as a carrier wave. The data signal represents power information for the load In accordance with another aspect of the present disclosure, a method is as follows. A data signal may be generated and transmitted through a power line supplying power including a current signal, to a load in an enclosed location. The data signal uses the current signal supplied through the power line as a carrier wave. The data signal represents power information for the load.

As described above, by transmitting/receiving a data signal using a current signal of power supplied on a power line as a carrier, power line communication may be performed through a further simple circuit structure.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout.

Figure 1:
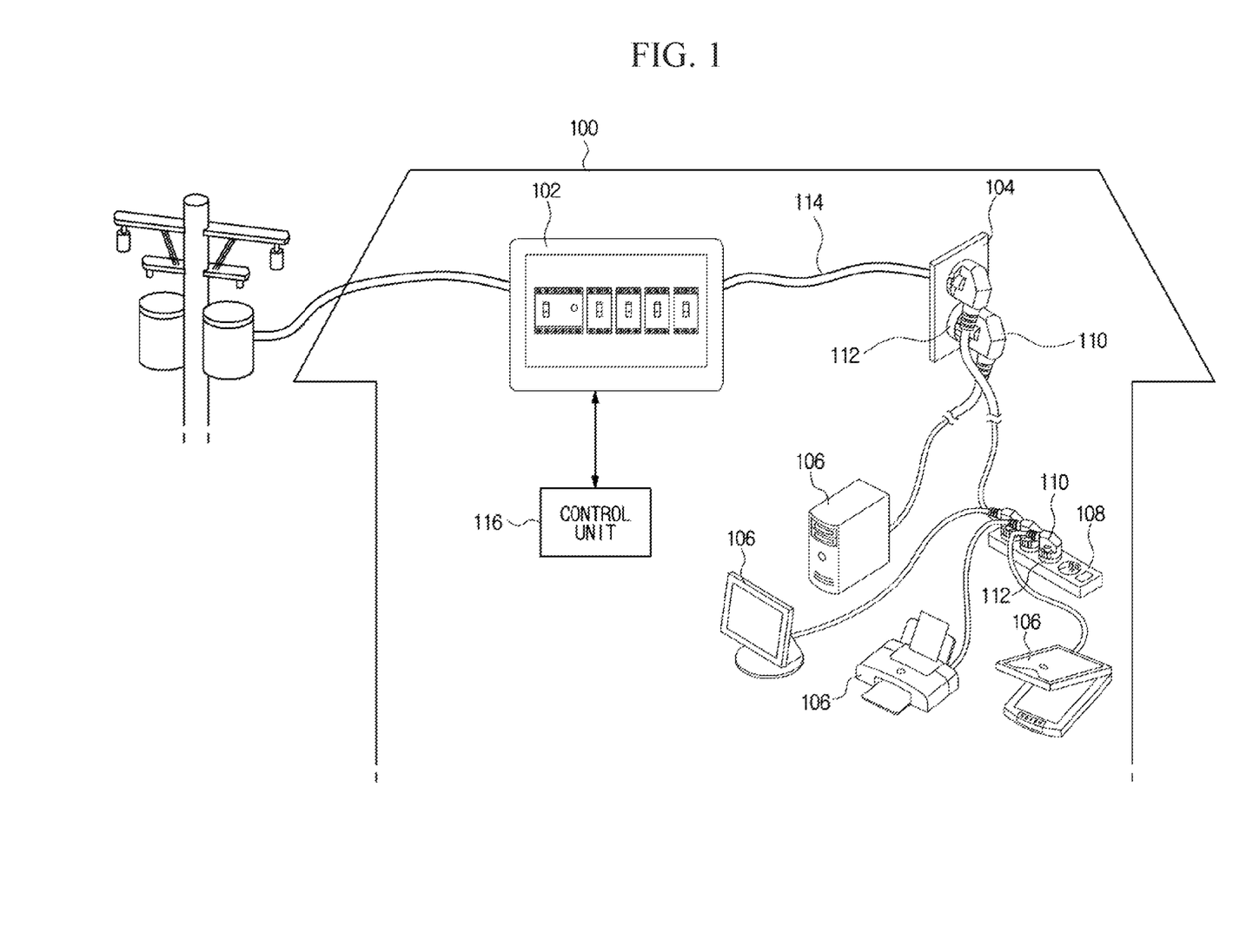
FIG. 1 is a diagram of power line communication in accordance with one embodiment of the present disclosure.

FIG. 1 is a diagram of a power line communication apparatus in accordance with an embodiment of the present disclosure. As illustrated in FIG. 1, power is supplied to a household (or a business location) 100 from an outside power supply source, and is delivered to a concentric plug, receptacle or outlet 104 by a distributor 102 at the household 100. The plug 104 represents a wall socket or an electric outlet, provided, for example, in a bedroom, a living room, or a kitchen. Household appliances 106 inside the household 100 are supplied with electricity as energy through the concentric plug 104, or receive power through a multi-tab or power strip 108 connected to the concentric plug 104. The household appliances 106 represent loads that consume power.

In an embodiment of the present disclosure, when inserting a plug 110 of a household appliance 106 into a socket of the concentric plug 104 or the multi-tab 108, a transmission unit 112 is coupled between the concentric plug 104 and the plug 110. The transmission unit 112 generates a data signal that shows status information for the household appliance 106 by using a current signal included in the power which is being supplied to the household apparatus 106, as a carrier wave, and transmits the data signal through a power line 114. A transmission unit 112 is installed at each plug 110 of each household appliance 106, and through the transmission unit 112, the status information of each household appliance 106 may be individually obtained. A reception unit 302 (FIG. 3) is installed at the distributor 102 and receives the data signal generated at the transmission unit 112 and transmitted over the power line 114. A control unit 116 restores and obtains the status information of the household appliance 106 from the data signal that is being received through the reception unit. The control unit 116 is an apparatus configured to perform load power monitoring that determines the status of each household appliance 106 by collecting the status information of the household appliance 106, and may be implemented on a smart phone or a home server, or may be implemented on a power supply control system of a power supply source. Based on the result of the load power monitoring, a power consumption savings policy or a power supply policy with respect to each household appliance 106 may be established to perform needed control.

Figure 2:
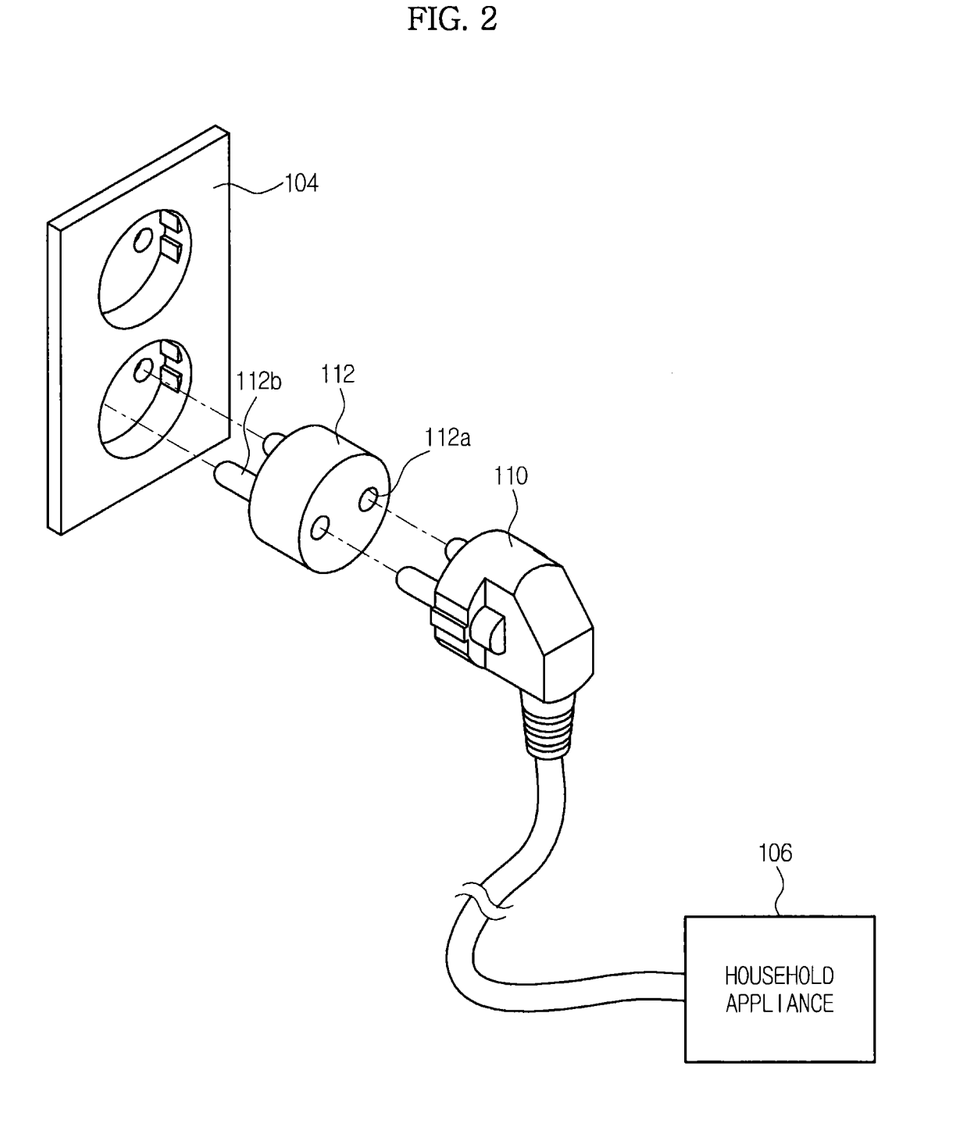
FIG. 2 is a diagram showing a coupling status of a concentric plug, a transmission unit, and a plug being shown on FIG. 1.

FIG. 2 is a diagram illustrating the coupling of the concentric plug 104, the transmission unit 112, and the plug 110 as shown on FIG. 1. As shown in FIG. 2, an insertion hole 112a into which the plug 110 may be inserted, is formed at one side of the transmission unit 112, while a terminal 112b protrudes from the transmission unit 112 in such a way as to be inserted into the concentric plug 104, and is provided at the other side of the transmission unit 112. The insertion hole 112a and the terminal 112b are electrically connected inside the transmission unit 112. Thus, when the plug 110 is inserted into the insertion hole 112a and the terminal 112b is inserted into the concentric plug 104, power may be supplied to the household appliance 106 through the concentric plug 104, the transmission unit 112, and the plug 110. The transmission unit 112 includes a circuit configured to generate a data signal using a current signal of the power, which is being supplied through the power line, as a carrier wave and to transmit the data signal.

Figure 3:
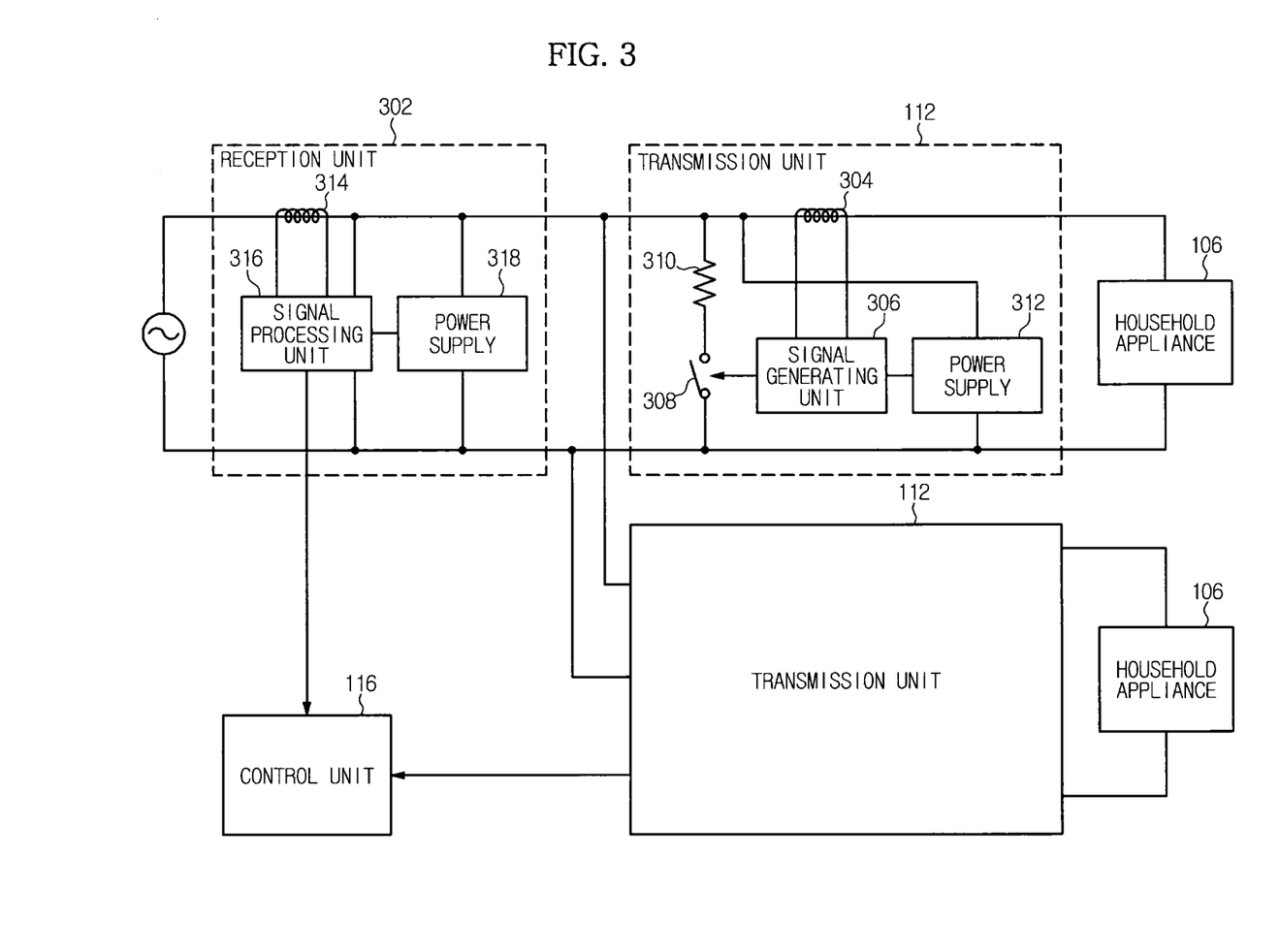
FIG. 3 is a circuit diagram of a circuit configuration of a transmission unit and a reception unit being shown on FIG. 1.

FIG. 3 is a circuit diagram of the transmission unit 112 and a reception unit 302. Transmission units 112 are installed in a one-to-one correspondence to each household appliance 106, and when plural transmission units 112 are installed, the plurality of transmission units 112 are connected in parallel. The reception unit 302 is installed at a node to which the plurality of transmission units 112 are commonly connected. For example, as shown in FIG. 1 and as described above, one reception unit 302 may be installed at the distributor 102 that supplies power to the household appliances 106.

The transmission unit 112 includes a current sensor 304 (a first current sensor), a signal generating unit 306, a switch 308, a resistor 310, and a power supply 312. The current sensor 304 detects the amount of current being supplied to a household appliance 106 to obtain the status information of the household appliance 106. The status information of the household appliance 106, for example, may be the ON/OFF status information, the amount of current (power) consumption information, or the power consumption pattern information of the household appliance 106. The signal generating unit 306 generates a data signal in a form of the pulse signal that shows the status information of the household appliance 106, based on the amount of current being detected by the current sensor 304. The signal generating unit 306 may be implemented by a micro computer unit (MCU), and may be loaded with a predetermined algorithm configured to convert the detected amount of the current into a data signal in the form of a pulse signal that corresponds to the detected amount of current. The signal generating unit 306, based on the above-described algorithm, generates the data signal that corresponds to the detected amount of the current. The data signal in the form of a pulse signal generated at the signal generating unit 306, is used to turn ON/OFF the switch 308. That is, in the high-level section of the data signal, the switch 308 is turned ON, and during the low-level section of the data signal, the switch 308 is turned OFF. When the switch 308 is turned ON, current flows through the resistor 310 and through the switch 308 that is turned ON. Thus, each time the switch 308 is turned ON, a pulse signal is formed. The pulse signal uses the current signal which is supplied to the household appliance 106, as a carrier wave and the combination of a series of the pulse signals forms the data signal. The switch 308 may be implemented by a relay or a high-power semiconductor switching device (for example, an insulated gate bipolar transistor: IGBT). The power supply 312 is configured to supply power to the signal generating unit 306.

The reception unit 302 includes a current sensor 314 (a second current sensor), a signal processing unit 316, and a power supply 318. The current sensor 314 detects the amount of power being supplied through the distributor 102, and is capable of directly reading the data signal, which is generated by the transmission unit 112 and loaded on the current signal of the power line 114, through the current sensor 314 (the reception of the data signal). The signal processing unit 316 restores the data signal based on the amount of the current of the power line 114 being detected by the current sensor 314, and transmits the restored data signal to the control unit 116. For the above, the signal processing unit 316 is loaded with an algorithm that is the same as the algorithm that is loaded on the signal generating unit 306.

The control unit 116 analyzes the data signal which is transmitted from the signal processing unit 316 of the reception unit 302 to obtain the status information of the household appliance 106 such as the ON/OFF status information of the load, the information regarding a the amount of power consumption, or the information on power consumption pattern. For the above, the control unit 116 is loaded with an algorithm that is the same as the algorithm that is loaded on the signal generating unit 306 and the signal processing unit 316. The control unit 116 collects the status information of each household appliance 106, and performs load power monitoring to determine the status of each household appliance 106. Based on the result of the load power monitoring, a power consumption savings policy or a power supply policy with respect to each household appliance 106 may be established to perform needed control.

Figure 4:
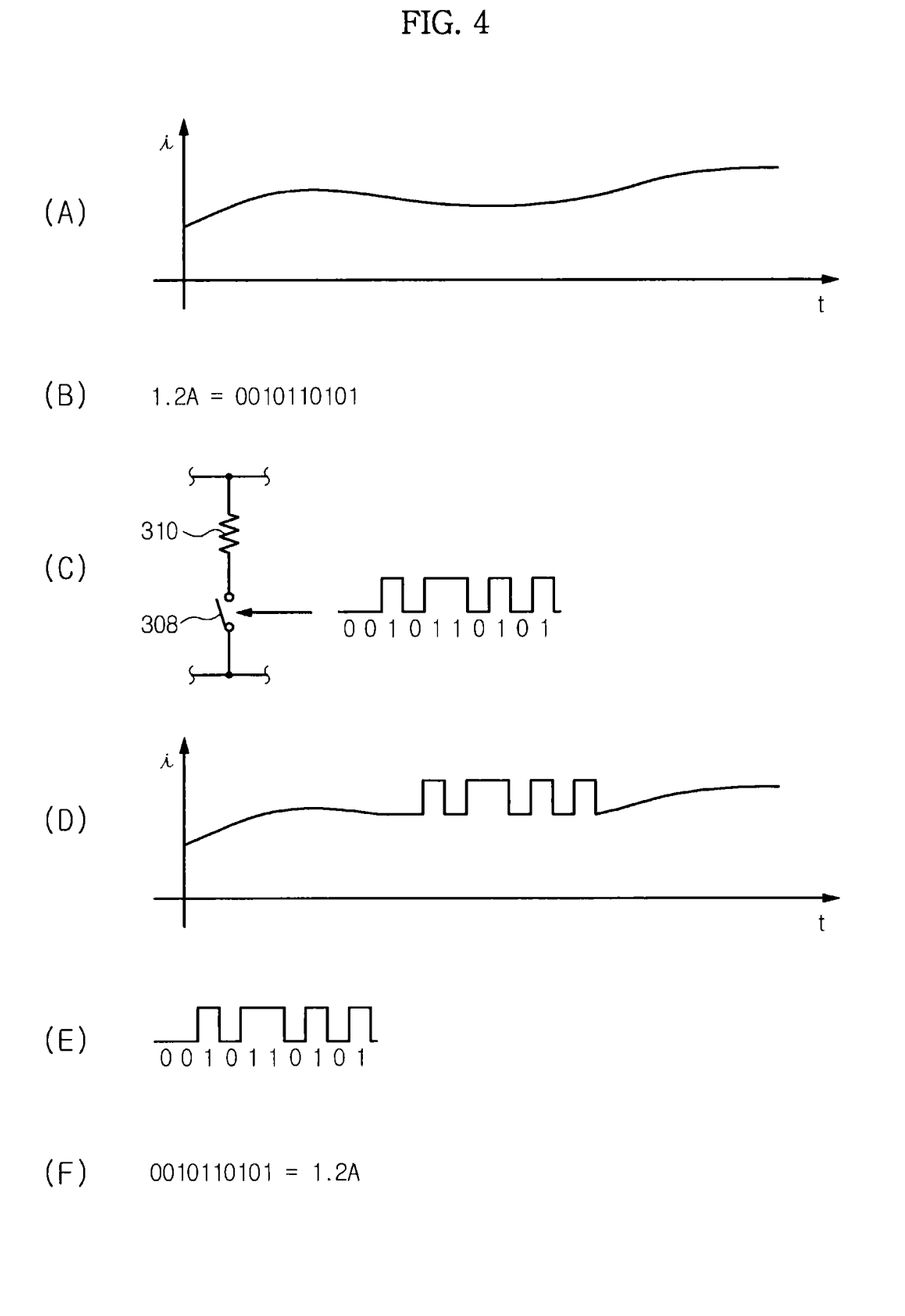
FIG. 4 illustrates waveforms for processes of generating, transmitting, receiving, and restoring a data signal with respect to the power line communication being shown on FIG. 3.

FIG. 4 is a drawing showing a process of generating, transmitting, receiving, and restoring a data signal with respect to the power line communication apparatus being shown in FIG. 3. The waveform shown at (A) of FIG. 4 is referred to as the waveform of the current which is supplied to the household appliance 106, that is, the waveform of the current being consumed at the household appliance 106. Through the waveform as such, the ON/OFF status of the household appliance 106, the amount of power consumption, and the power consumption pattern may be determined. For example, when a section in which the amount of the current is near 0 at the current waveform is continued for a longer period of time than a certain time period, it may be determined that the household appliance 106 is in the OFF status or the IDLE status. In addition, information relating to the time during which the consumption of power is high or low may be obtained. The equation (B) of FIG. 4 is an example of the data signal that corresponds to the amount of current that is detected through the current sensor 304 of FIG. 3. For example, when the amount of the current detected at the current sensor 304 is about 1.2 A (Ampere), the signal generating unit 306, according to the predetermined algorithm, generates a data signal that corresponds to 1.2 A, for example, a data signal '0010110101'. The format of the data signal that corresponds to the detected amount of the current is in compliance with a regulation designated at the algorithm, and depending on the manner of the regulation being designated, the format of the data signal may vary. The signal generating unit 306, as shown in waveform (C) of FIG. 4. uses the data signal '0010110101' as a switching control signal, to turn ON/OFF the switch 308. That is, in the '0' section of the data signal, a pulse is not being generated (the switch 308 is OFF) but by generating a pulse in the '1' section of the data signal (the switch 308 is ON), a pulse signal is generated as shown in waveform (C) of FIG. 4. By using the pulse signal, the switch 308 is turned ON/OFF. By the ON/OFF of the switch 308, as shown in waveform (D) of FIG. 4, the data signal '0010110101' is loaded on the current signal of waveform (A) of FIG. 4. The reception unit 302, by receiving and converting the data signal loaded on the current signal of the power line, obtains the data signal '0010110101' that is the same as the data signal shown in (E) of FIG. 4. The control unit 116, by receiving and analyzing the restored data signal '0010110101', is able to determine that the amount of the current being used at the household appliance 106 is about 1.2 A.

Figure 5:
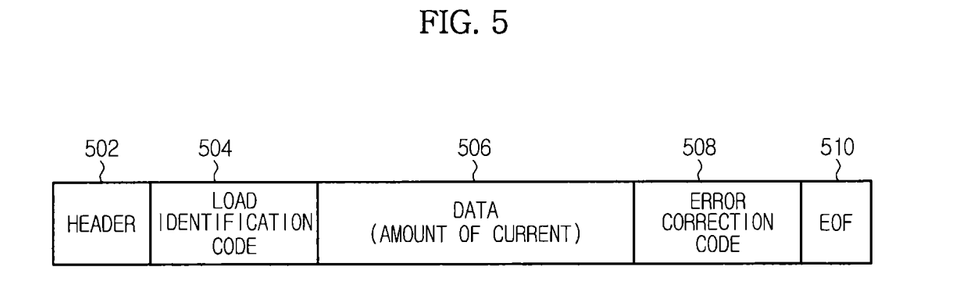
FIG. 5 is a diagram of the structure of the data signal being handled in the power line communication in accordance with one embodiment of the present disclosure.

FIG. 5 is a diagram illustrating the structure of the data signal being processed at the power line communication apparatus in accordance with an embodiment of the present disclosure. As shown in FIG. 3 and as described above, as for the power line communication apparatus in accordance with an embodiment of the present disclosure, since the signals being transmitted from the plurality of transmission units 112 are received by the single reception unit 302 and then transmitted to the control unit 116, the data signals that are being transmitted from each transmission unit 112 need to be distinguished from each other. Further, the data signals transmitted from the plurality of transmission units 112 may overlap each other, and thus preparations may be needed if an error occurs when the signals overlap each other. As a result in one embodiment of the present disclosure, a data signal (a packet) having the structure shown in FIG. 5 is used.

As shown on FIG. 5, the data signal in accordance with one embodiment of the present disclosure includes a header 502, a load identification code 504, data 506, an error correction code 508, and an EOF (End of File) 510. The header 502 and the EOF 510 represent the beginning and the end of the data signal, respectively. The load identification code 504 is configured to identify from which load, that is, from which one of the house appliances 106 the corresponding signal is being transmitted. A unique identification code is assigned to each transmission unit 112 in advance. By determining which of the transmission units 112 is connected to a particular one of the household appliances 106 via the concentric plug 104 or the multi-tab 108, the status information of the household appliance 106 connected to the concentric plug 104 or to the multi-tab 108 through the corresponding transmission unit 112 may be distinguished by analysis of the data signal transmitted from the particular transmission unit 112. The data 506 is referred to as the data of the amount of the current, which is being supplied to the household appliance 106, detected by the current sensor 304. The error correction code 508 is provided to prepare for an error that may occur when the signals being transmitted from the plurality of transmission units 112 overlap each other. Other methods of handling these errors include a method of repeatedly transmitting the data signal, a method of transmitting the data signal in a sufficiently short period of time, and a method of allowing a signal level to be significantly larger than a noise component at the pulse section of the data signal.

Figure 6:
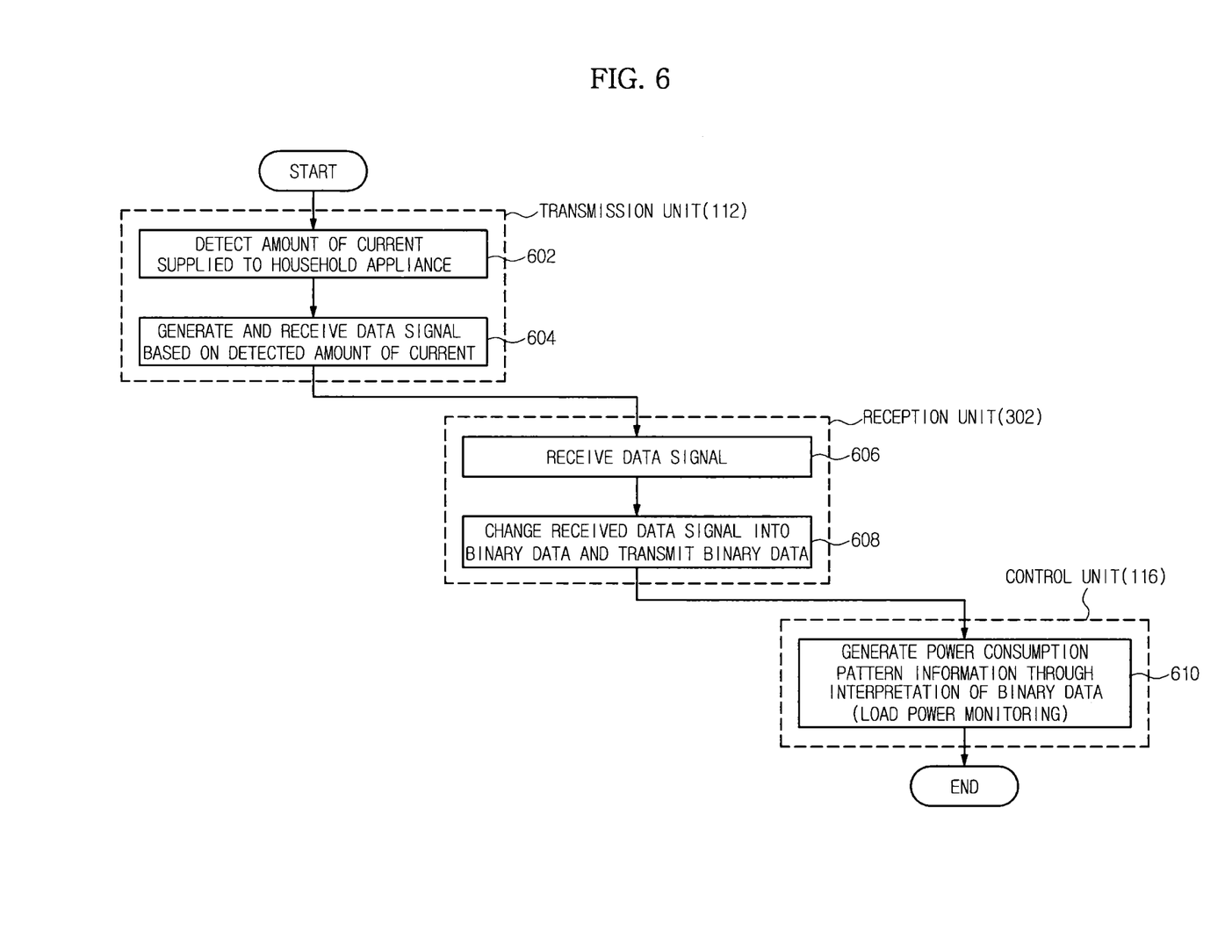
FIG. 6 is a flow diagram illustrating a load power monitoring method using power line communication in accordance with one embodiment of the present disclosure.

FIG. 6 is a flow diagram illustrating a load power monitoring method using power line communication in accordance with an embodiment of the present disclosure. In FIG. 6, operations 602 and 604 are processes performed at the transmission unit 112, operations 606 and 608 are processes performed at the reception unit 302, and operation 610 is a process performed at the control unit 116.

As shown in FIG. 6, the amount of current supplied to the household appliance 106 is detected through the current sensor 304 of the transmission unit 112 to obtain status information of the household appliance 106 from the detected amount of current (602). The signal generating unit 306 of the transmission unit 112, based on the amount of the current detected by the current sensor 304, generates the data signal, which is provided in the form of a pulse signal that shows the status information of the household appliance 106, through the predetermined algorithm, and transmits the data signal loaded on the current signal of the power line (604).

The current sensor 314 of the reception unit 302 detects the amount of the power being supplied through the distributor 102, and directly receives the data signal, which is generated at the transmission unit 112 and is loaded on the current signal of the power line, through the current detection of the current sensor 314 (606). The signal processing unit 316 converts the data signal into the amount of current of the power line that is detected by the current sensor 314, and transmits the converted data signal to the control unit 116 (608).

The control unit 116, by analyzing the data signal transmitted from the signal processing unit 316 of the reception unit 302, performs load power monitoring to obtain the status information of the household appliance 106, such as the ON/OFF status information of the load, the information on the amount of power consumption, or the information on power consumption pattern (610). The control unit 116, through the load power monitoring method, collects the status information of each household appliance 106, establishes a power consumption savings policy or a power supply policy based on the status information of each household appliance 106, such as the ON/OFF status information of the load, the information on the amount of power consumption, or the information on power consumption pattern, and according to the policies established, the power consumption or the power supply may be controlled.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A power line communication apparatus, comprising:
    a transmission unit connectable to a reception unit by being coupled between a power outlet coupled to a power line supplying power and a power plug of a load that consumes power via the power outlet, the transmission unit configured to,
    while being connected to the reception unit by being coupled between the load and the power outlet coupled to the power line supplying the power:
        detect an amount of the power being supplied to the load via the power outlet coupled to the power line, to obtain status information of the load corresponding to the detected amount of the supplied power,
        generate a data signal indicating the obtained status information,
        load the generated data signal on a current signal to flow as a carrier wave in the power line, and
        transmit, to the reception unit, the current signal having the generated data signal loaded thereon, via the power line coupled to the power outlet, for the reception unit to receive the transmitted current signal having the generated data signal via the power line, detect the generated data signal loaded on the received current signal and process the detected data signal based on the amount of current detected, wherein the transmission unit comprises:
a current sensor configured to detect an amount of current being supplied to the load, thereby to detect the amount of the supplied power;
a signal generating unit configured to generate the data signal indicating the obtained status information;
a switch configured to be turned ON and OFF by the generated data signal, to load the generated data signal on the current signal; and
a resistor connected with the switch to flow a current through the resistor when the switch is turned ON.

2. The power line communication apparatus of claim 1, wherein the obtained status information includes status information of the load that is supplied with the amount of the power supplied through the power outlet coupled to the power line.

3. The power line communication apparatus of claim 2, wherein the status information of the load is at least one of ON and OFF status information of the load, information on an amount of power consumption of the load, and information on a power consumption pattern of the load.

4. The power line communication apparatus of claim 1, further comprising at least one additional transmission unit for at least one additional load respectively, wherein each of the transmission unit and at least one additional transmission unit is installed to correspond to a respective load of the load and the at least one additional load.

5. The power line communication apparatus of claim 4, wherein each of the transmission unit and at least one additional transmission unit is coupleable between a concentric plug as the power outlet and the power plug of the load so as to be electrically connected to the concentric plug and the power plug of the load.

6. The power line communication apparatus of claim 1, further comprising a reception unit configured to receive the transmitted current signal having the generated data signal loaded thereon via the power line,
wherein:
the load and at least one additional load are connected to the reception unit, and
the reception unit is installed at a node to which the load and the at least one additional load are commonly connected.

7. The power line communication apparatus of claim 6, wherein the node to which the load and the at least one additional load are commonly connected comprises a distributor configured to supply power to the load and the at least one additional load.

8. The power line communication apparatus of claim 1, wherein:
the reception unit comprises:
a current sensor configured to detect the generated data signal loaded on the received current signal being received through the power line by detecting an amount of current that flows through the power line; and
a signal processing unit configured to process the detected data signal based on the detected amount of the current detected by the current sensor.

9. A load power monitoring apparatus using power line communication, comprising:
a transmission unit couplable between a power outlet coupled to a power line supplying power and a power plug of a load that consumes power via the power outlet, the transmission unit configured to,
while being coupled between the load and the power outlet coupled to the power line supplying the power:
detect an amount of the power being supplied to the load via the power outlet coupled to the power line, to obtain status information of the load corresponding to the detected amount of the supplied power,
generate a data signal indicating the obtained status information of the load,
load the generated data signal on a current signal to flow as a carrier wave in the power line, and
transmit the current signal having the generated data signal loaded thereon via the power line coupled to power plug;
a reception unit coupled to the power line and configured to:
receive the transmitted current signal having the generated data signal loaded on the generated data signal via the power line, detect the generated data signal loaded on the received current signal and process the detected data signal based on an amount of current detected; and
a control unit configured to determine a status of the load by determining the obtained status information of the load from the generated data signal loaded on the received current signal,
wherein the transmission unit comprises:
a current sensor configured to detect an amount of current being supplied to the load, thereby to detect the amount of the supplied power;
a signal generating unit configured to generate the data signal indicating the obtained status information;
a switch configured to be turned ON and OFF by the generated data signal, to load the generated data signal on the current signal; and
a resistor connected with the switch to flow a current through the resistor when the switch is turned ON.

10. The load power monitoring apparatus of claim 9, wherein the obtained status information of the load includes at least one of ON and OFF status information of the load, information on the amount of power consumption of the load, and information on a power consumption pattern of the load.

11. The load power monitoring apparatus of claim 9, further comprising at least one additional transmission unit for at least one additional load respectively, wherein each of the transmission unit and at least one additional transmission unit is installed to correspond to each respective load of the load and the at least one additional load.

12. The load power monitoring apparatus of claim 11, wherein each of the transmission unit and at least one additional transmission unit is coupleable between a concentric plug as the power outlet and the power plug of the load so as to be electrically connected to the concentric plug and the power plug of the load.

13. The load power monitoring apparatus of claim 9, wherein:
the load and at least one additional load are connected to the reception unit, and
the reception unit is installed at a node to which the load and the at least one additional load are commonly connected.

14. The load power monitoring apparatus of claim 13, wherein the node to which the load and the at least one additional load are commonly connected comprises a distributor configured to supply power to the load and the at least one additional load.

15. The load power monitoring apparatus of claim 9, wherein the reception unit comprises:
a current sensor configured to detect the generated data signal from the current signal being received through the power line by detecting an amount of a current that flows through the power line; and a signal processing unit configured to process the detected data signal based on the detected amount of the current detected by the current sensor.

16. A power line communication method, comprising:

by a transmission unit connectable to a reception unit by being couplabled between a power outlet coupled to a power line supplying power and a power plug of a load that consumes power, while being connected to the reception unit by being coupled between the load and the power outlet coupled to the power line supplying the power:

detecting an amount of the power being supplied to the load via the power outlet coupled to the power line,     obtaining status information of the load corresponding to the detected amount of the supplied power,     generating a data signal indicating the obtained status information,     loading the generated data signal on a current signal to flow as a carrier wave in the power line, and     transmitting, to the reception unit, the current signal having the generated data signal loaded thereon, via the power line coupled to the power outlet, for the reception unit to receive the transmitted current signal having the generated data signal via the power line and process the generated data signal based on the amount of current detected, wherein the transmission unit comprises:

a current sensor configured to detect an amount of current being supplied to the load, thereby to detect the amount of the supplied power;

a signal generating unit configured to generate the data signal indicating the obtained status information;

a switch configured to be turned ON and OFF by the generated data signal, to load the generated data signal on the current signal; and     a resistor connected with the switch to flow a current through the resistor when the switch is turned ON.

17. The power line communication method of claim 16, wherein the obtained status information includes status information of the load that operates by being supplied with the amount of the power supplied through the power line.

18. The power line communication method of claim 17, wherein the status information of the load is at least one of ON and OFF status information of the load, information on the amount of power consumption of the load, and information on a power consumption pattern of the load.

19. A load power monitoring method, the method comprising:

by a transmission unit coupled between a power outlet connected to a power line supplying power and a power plug of a load that consumes power:

detecting an amount of the power being supplied to the load via the power outlet coupled to the power line,     obtaining status information of the load corresponding to the detected amount of the supplied power,     generating a data signal indicating the obtained status information of the load,     loading the generated data signal on a current signal to flow as a carrier wave in the power line, and     transmitting the current signal having the generated data signal loaded thereon via the power line coupled to the power plug;

by a reception unit coupled to the power line, receiving the transmitted current signal having the generated data signal loaded via the power line, detecting the generated data signal loaded on the received current signal and processing the detected data signal based on an amount of current detected; and by a control unit, converting the obtained status information of the load from the generated data signal loaded on the received current signal, wherein the transmission unit comprises:

a current sensor configured to detect an amount of current being supplied to the load, thereby to detect the amount of the supplied power;

a signal generating unit configured to generate the data signal indicating the obtained status information;

a switch configured to be turned ON and OFF by the generated data signal, to load the generated data signal on the current signal; and     a resistor connected with the switch to flow a current through the resistor when the switch is turned ON.

20. The load power monitoring method of claim 19, wherein the obtained status information of the load includes at least one of ON and OFF status information of the load, information on the amount of power consumption of the load, and information on a power consumption pattern of the load.

* * * * *